United States Patent
Katoh et al.

(10) Patent No.: US 7,377,601 B2
(45) Date of Patent: May 27, 2008

(54) DETACHABLE CRAWLER

(75) Inventors: Yusaku Katoh, Hiroshima (JP); Tatsuya Noritoh, Okayama (JP)

(73) Assignee: Fukuyama Gomu Kogyo Kabushiki Gaisha, Fukuyama (JP)

( * ) Notice: Subject to any disclaimer, the term of this patent is extended or adjusted under 35 U.S.C. 154(b) by 569 days.

(21) Appl. No.: 10/481,336

(22) PCT Filed: Jun. 19, 2002

(86) PCT No.: PCT/JP02/06129

§ 371 (c)(1),
(2), (4) Date: Dec. 22, 2003

(87) PCT Pub. No.: WO03/000537

PCT Pub. Date: Jan. 3, 2003

(65) Prior Publication Data

US 2004/0150263 A1 Aug. 5, 2004

(30) Foreign Application Priority Data

Jun. 21, 2001 (JP) ............................. 2001-188096

(51) Int. Cl.
*B65G 15/44* (2006.01)
*B62D 55/205* (2006.01)
(52) U.S. Cl. ...................... 305/180; 305/161
(58) Field of Classification Search ............... 305/171, 305/162, 166–167, 177, 182–183, 187, 157–158, 305/165, 170, 172, 176, 180, 46, 161, 51
See application file for complete search history.

(56) References Cited

U.S. PATENT DOCUMENTS

| 2,040,696 | A | * | 5/1936 | Johnston | 305/171 |
| 2,378,427 | A | * | 6/1945 | Myers | 305/180 |
| 3,785,420 | A | * | 1/1974 | Bradley et al. | 411/188 |
| 4,059,315 | A | * | 11/1977 | Jolliffe et al. | 305/180 |
| 4,758,055 | A | * | 7/1988 | Anderson | 305/180 |
| 6,460,945 | B2 | * | 10/2002 | Takeno et al. | 305/167 |
| 6,520,603 | B2 | * | 2/2003 | Shimada et al. | 305/167 |

FOREIGN PATENT DOCUMENTS

| JP | 56-8589 | | 1/1981 | |
| JP | 4-133876 | * | 5/1992 | 305/171 |
| JP | 4-266577 | | 9/1992 | |
| JP | 06-61672 | | 8/1994 | |

* cited by examiner

*Primary Examiner*—Jason R. Bellinger
(74) *Attorney, Agent, or Firm*—Merek, Blackmon & Voorhees, LLC

(57) ABSTRACT

A detachable crawler (1, 20) capable of increasing the durability thereof on a rubber belt part (4) body side, wherein each of a metal core (6) and a track shoe (21) of a detachable pad (5) is formed so that tightening force in a specific range (approx. 4.90 to 78.5 MPa per unit area) can be applied to a rubber elastic body (4a) including a tensile reinforcing layer (2) sandwiched between a core bar (3) in the rubber belt part (4) and the metal core (6) or steel track shoe (21) of the detachable paid (5).

5 Claims, 20 Drawing Sheets

A

B

PRIOR ART

DETACHABLE CRAWLER

FIELD OF THE INVENTION

The present invention relates to a crawler for use and installation in an endless track travel device driving agricultural work cars, civil engineering working machines or construction machines.

BACKGROUND OF THE INVENTION

Iron crawlers, rubber crawlers and connecting link rubber crawlers have long been used as endless track travel devices for driving construction machines.

A conventional iron crawler is so constructed that steel track shoes are fitted to an endless connecting link pivotally connecting a pair of track links with pins (by welding or a bolt/nut mechanism). In this case, since mechanical connecting force between the track links is large, the iron crawler excels in durability. Besides, when a track shoe is abraded, it is exchangeable. However, the iron crawler has such trouble as a large creaky noise due to the track links, and driver's fatigue due to scanty cushion performance. Besides, if the iron crawler drives on pavements in urban areas, the road surface is damaged.

A conventional rubber crawler is so constructed that metal core bars and steel cords serving as a tensile reinforcing layer are embedded in a rubber elastic body. In this case, there is little noise, cushion performance is good, and the road surface is not damaged. Besides, since the rubber crawler is comparative lightweight, it can drive speedily. However, when the rubber crawler drives on sharp rocks or engineering wastes, cuts sometimes happen in the rubber part. When cuts get to any steel cords of the rubber crawler, the steel cords break due to cutting or corrosion. Therefore, the rubber crawler is unserviceable whether the rubber part is still available or not. Besides, when a tread lug rubber part is abraded by friction with the road surface, the whole rubber crawler must be integrally exchanged.

Recently, there has been a connecting link rubber crawler that makes good use of each merit of the conventional iron crawler and rubber crawler and makes up for each fault thereof. The conventional connecting link rubber crawler is so constructed that rubber pads (divided type or continuous type) are fitted to an endless connecting link pivotally connecting a pair of track links with pins (by welding or a bolt/nut mechanism). Here, a rubber pad is so made that a rubber elastic body is molded and fixed to a metal core. The connecting link rubber crawler has some merit as shown below. That is, since the mechanical connecting force between the track links is large, the connecting link rubber crawler excels in durability. When the tread lug rubber part of the rubber pad is abraded, only the rubber pad need be exchanged. Besides, the road surface is not damaged. However, since the connecting link rubber crawler uses connecting links composed of track links, the noise is large. Accordingly, since night engineering works are increased in urban areas recently, there is still an important noise problem in the connecting link rubber crawler.

Moreover, a detachable rubber crawler is disclosed in Japanese Patent Provisional Publication No. 133876 of 1992. The detachable rubber crawler is provided with tread lug rubber parts to be exchanged when they are abraded or lacking, or when their lug shape is changed in accordance with soil properties. The detachable rubber crawler, as shown in FIG. 19 and FIG. 20, comprises lug rubber parts 22 of one to two or more independent joint articles (which are detachable rubber pads) and a rubber belt part 26. The rubber belt part 26 is arranged on a crawler anti-tread (driving wheel) side with a tensile reinforcing layer 24 and core bars 25 embedded in a rubber elastic body 23. A lug rubber part 22 is provided with a steel metal core 27 and two or more steel pipes 29 each having a hole through which a bolt 28 for fastening the rubber belt part 26 welded to the metal core 27 is passed. A core bar 25 embedded in the rubber belt part 26 is provided with two or more holes with a fixed depth necessary for the steel pipes 29 and holes necessary for the bolts 28 on the same axis therewith. Here, in drawings, 30 is a nut, and 31 is a washer.

In the above-mentioned detachable rubber crawler, when the lug rubber parts are abraded or missing, they can be exchanged. Besides, since the detachable rubber crawler uses not connecting links but rather a rubber belt part, the noise problem can be quieted.

However, as for the rubber belt part, when a large driving force is added to the rubber crawler, a large shear force acts between the core bar and the steel cords, as in the conventional rubber crawler. When the large shear force acts repeatedly, the bonded portion between the core bar and the steel cords gradually causes a fatigue failure. Therefore, since the rubber belt part is damaged over time, the detachable rubber crawler can not completely make good use of the advantage of the exchangeable lug rubber part.

SUMMARY OF THE INVENTION

The present invention aims to settle the above-mentioned problems. In the present invention, a crawler comprises detachable pads of one to two or more independent joint articles and a rubber belt part arranged on a crawler anti-tread (driving wheel) side with a tensile reinforcing layer and core bars embedded in a rubber elastic body. And therein, the detachable pads are detachably fitted to the rubber belt part, thereby forming a detachable crawler capable of exchanging them. Here, the rubber elastic body having the tensile reinforcing layer is sandwiched and pressed between the core bars and metal cores or steel track shoes of the detachable pads, thereby affecting enforcing pressure in a fixed range. Therefore, the durability of the rubber belt part increases in durability, as does a unit-area drawing shear stress between the rubber elastic body and the tensile reinforcing layer, thereby enabling the detachable crawler to prevent noise and to improve in durability in addition to being convenient.

In the rubber belt part, the tensile reinforcing layer is so formed that two or more tensile reinforcing members are arranged and embedded in the rubber elastic body, extending parallel to one another in the direction of the circumference of the crawler and defining rows across the crawler in its width direction, and the core bars are embedded in the rubber belt part at a fixed interval along the crawler circumference direction. The detachable pads are exchangeably fitted to a tread side of the rubber belt part by fastening fixtures. In this case, the rubber elastic body, including the tensile reinforcing layer sandwiched between the metal cores or the steel track shoes of the detachable pads and the core bars in the rubber belt part, is pressed by tightening the fastening fixtures.

In addition, the present invention is characterized by the above-mentioned tightening force being in a specific range, namely, 4.90 to 78.5 MPa (50 to 800 kgf/cm$^2$), preferably 7.85 to 58.8 MPa (80 to 600 kgf/cm$^2$), more preferably 7.85 to 39.23 MPa (80 to 400 kgf/cm$^2$) per unit area of the rubber elastic body including the tensile reinforcing layer.

A graph in FIG. 18 shows the relation of tightening force and shear drawing strength. That is, it shows the relation of tightening force per unit area (MPa) for pressing the steel cords and the rubber elastic body, and shear drawing strength per unit area (MPa) between the steel cords and the rubber elastic body.

In the graph, the line A shows an example in which the steel cords and the rubber elastic body are molded and fixed. The shear strength is 7.85 MPa (80 kgf/cm$^2$) when the steel cords and the rubber elastic body are not pressed, whereas it increases in 10.59 MPa (108 kgf/cm$^2$) when they are pressed by a 9.81 MPa (100 kgf/cm$^2$) tightening force.

The line B shows an example in which the steel cords and the rubber elastic body are not molded and fixed. Though the shear strength is naturally 0.00 MPa when they are not pressed, it is 10.40 MPa (106 kgf/cm$^2$) when they are pressed by a 9.81 MPa (100 kgf/cm$^2$) tightening force. Accordingly, the tightening operation increases the shear strength of 0.00 MPa to more than the 7.85 MPa (80 kgf/cm$^2$) corresponding to the shear strength of the rubber elastic body molded and fixed to the steel cords.

Accordingly, since the fixing layer between the steel cords and the rubber elastic body is not fatigued, the shear strength therebetween is not reduced but maintained suitably. Therefore, the durability of the rubber belt part increases.

Though steel cords are usually used as tensile reinforcing members, high-strength synthetic fibers can be also used. The type of tensile reinforcing member that can be used is not particularly limited.

Though a bolt and a nut are mainly used as the fastening fixture, a wedge system or another system can be also used. The fastening system may be any by which the pads are suitably fitted, to or removed from the rubber belt part, and pressed with the necessary tightening force.

Each of the detachable pads may be a continuous pad in the crawler width direction with a size corresponding to a core bar embedded in the rubber belt part. In addition, it may be one divided into right and left portions in the crawler width direction. Moreover, it may be in a size extending over two adjacent core bars in the crawler circumference direction, or over three core bars.

When each of the detachable pads is divided into right and left portions in the crawler width direction with a size extending over two or three core bars, the divided pads may be shifted relative to each other in the crawler circumferential direction in a staggered arrangement. Naturally, as an alternative, they may be arranged in the same position on both sides.

The detachable pads may comprise one article, or two or more joined articles that are independent respectively. Furthermore, an iron pad of a steel track shoe, a rubber pad having a rubber elastic body molded and fixed to a metal core, or a resin pad having urethane, thermoplastic or thermosetting resin, or plastic fixed to a metal core may be used as the pad part. Similarly, urethane, thermoplastic or thermosetting resin, or plastic may be used as the rubber elastic body of the rubber belt part.

PREFERRED EMBODIMENT OF THE INVENTION

Figure 1:
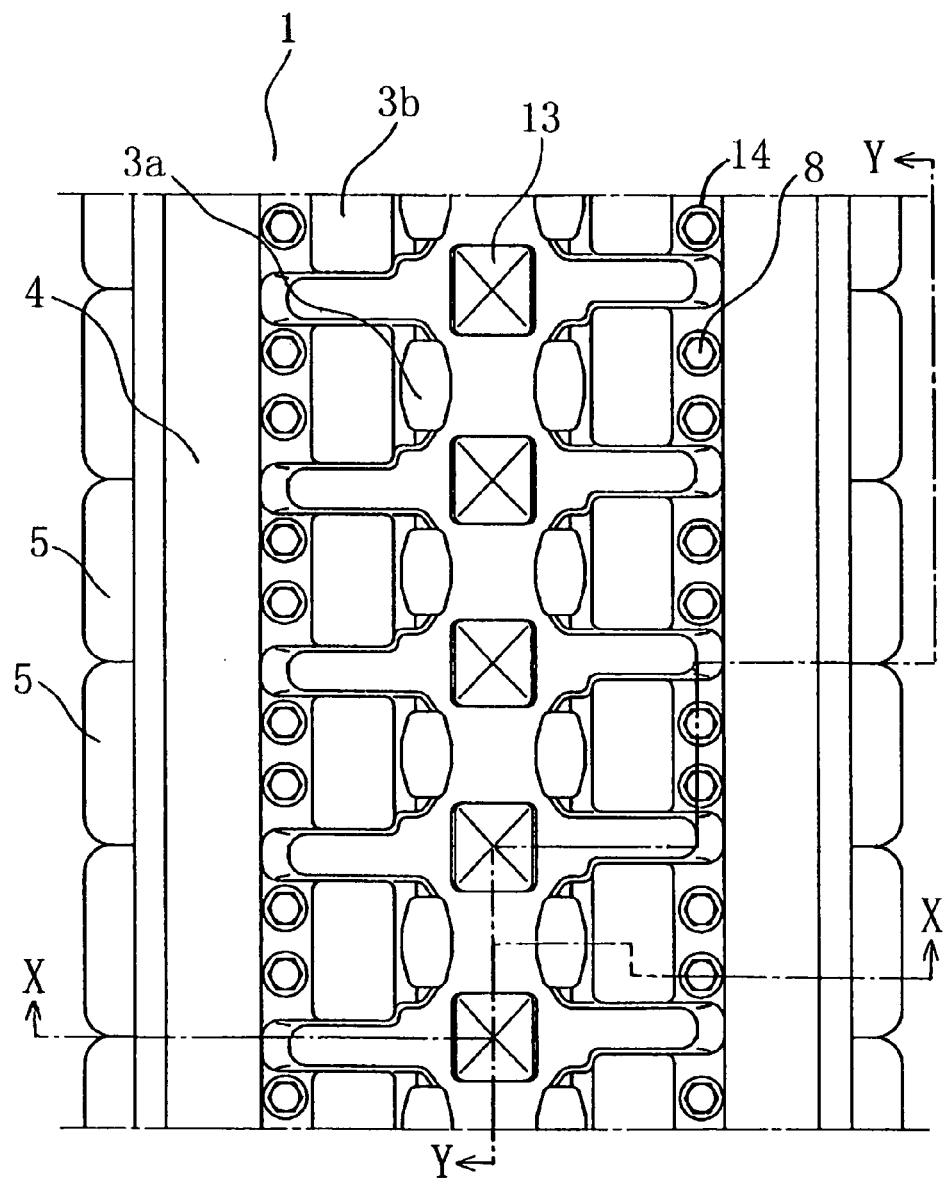
FIG. 1 is a plan view showing a side opposite a tread side of a detachable rubber crawler of a first embodiment.
Figure 2:
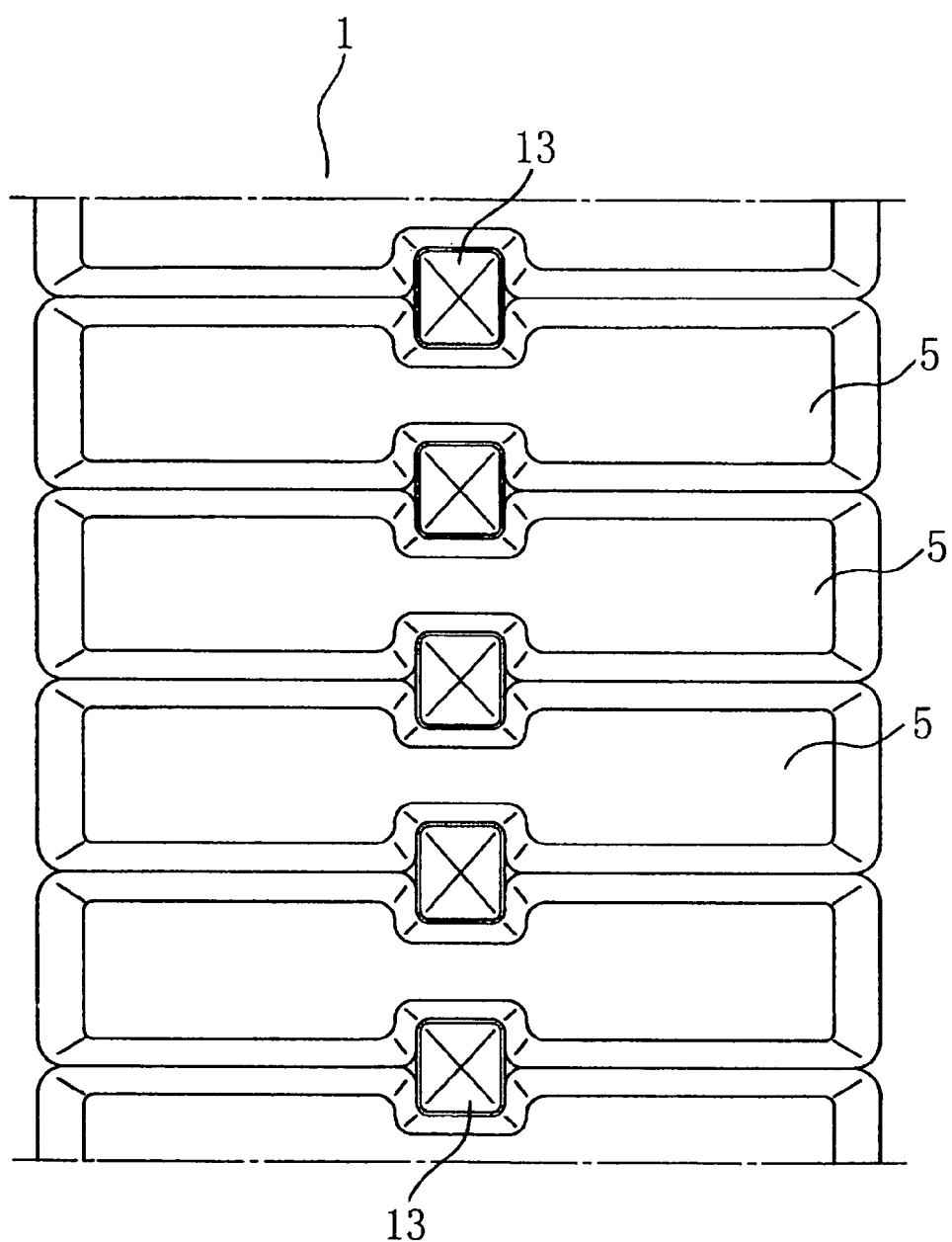
FIG. 2 is a plan view showing the tread side of the detachable rubber crawler of the first embodiment.
Figure 3:
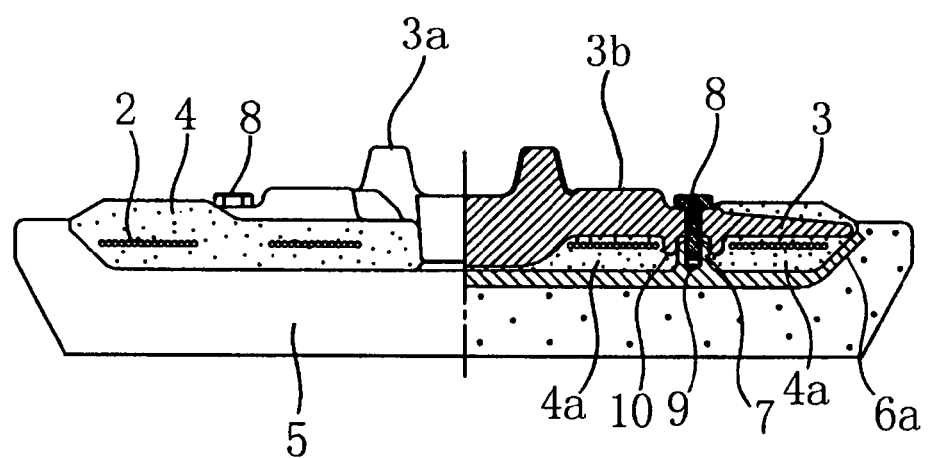
FIG. 3 is a section view taken on line X-X in FIG. 1.
Figure 4:
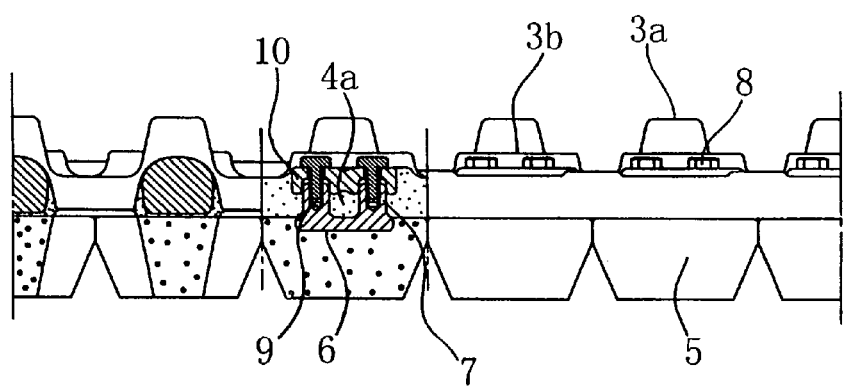
FIG. 4 is a section view taken on line Y-Y in FIG. 1.
Figure 5:
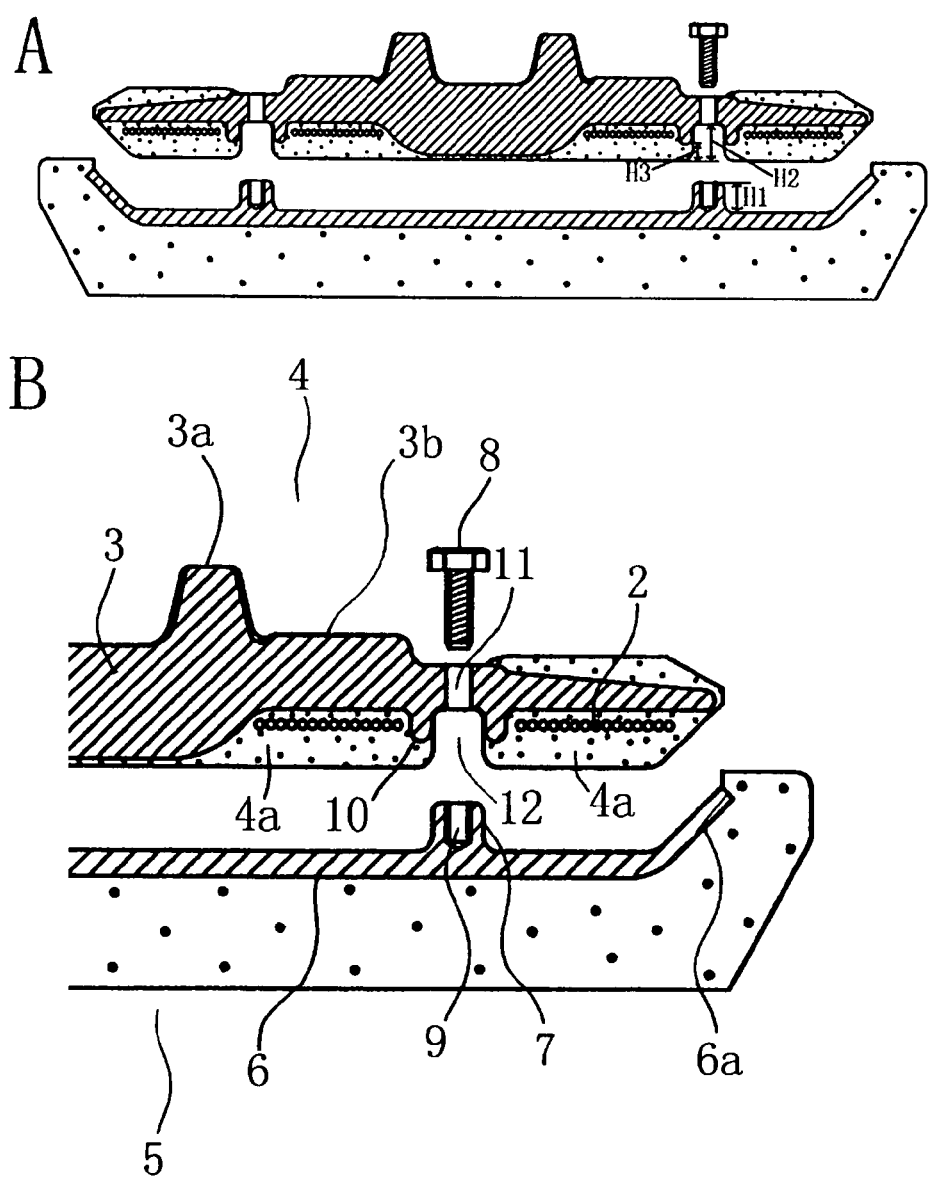
FIG. 5A is a section view of a detachable pad (rubber pad) of the detachable rubber crawler of the first embodiment fitted to a rubber belt part.
FIG. 5B is a greatly enlarged section view of an important part in FIG. 5A.
Figure 6:
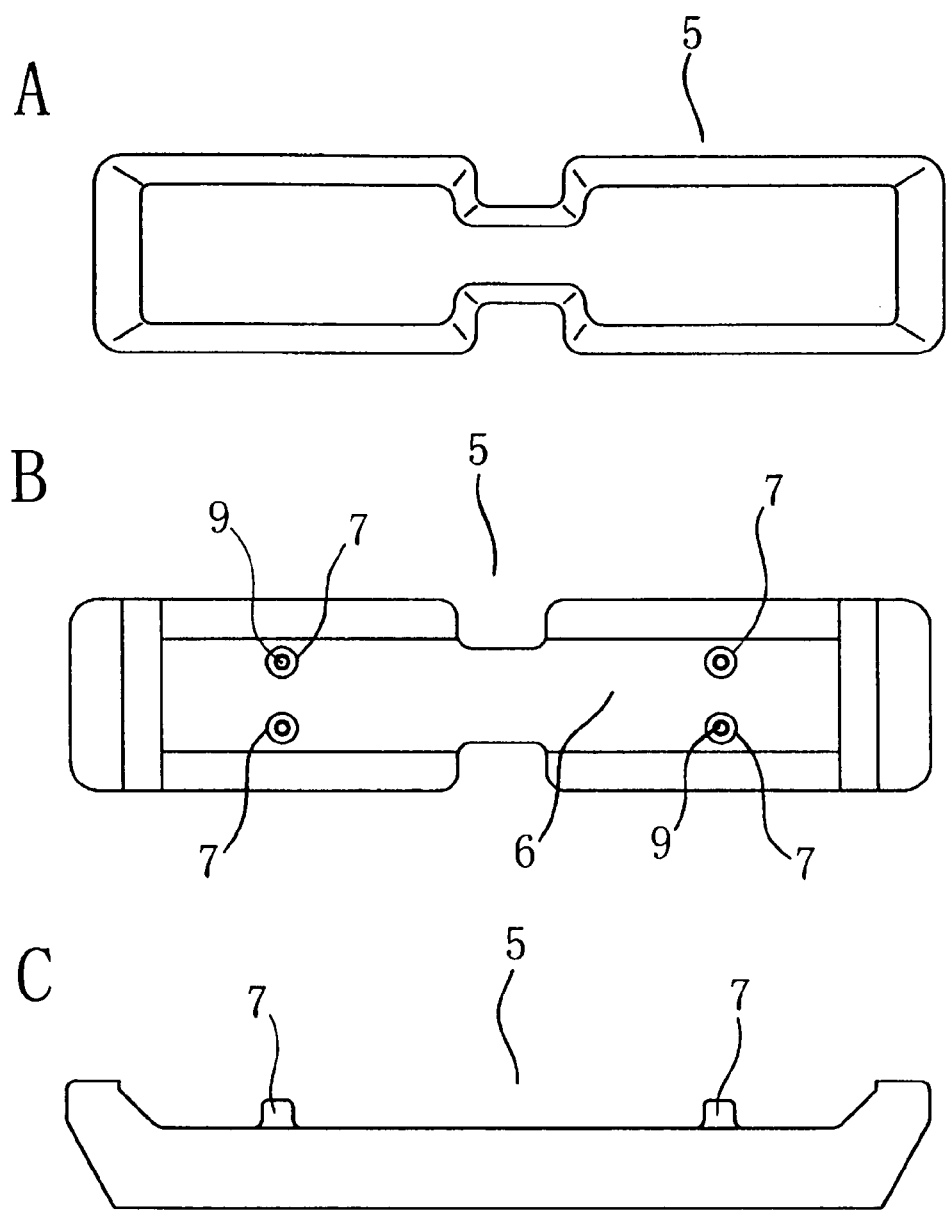
FIG. 6A is a plan view showing a tread side of the detachable pad (rubber pad) of the detachable rubber crawler of the first embodiment.
FIG. 6B is a plan view showing the side opposite the tread side of the rubber pad.
FIG. 6C is a side view of the detachable pad (rubber pad).

Embodiments in the present invention will be explained in detail with reference to the drawings. FIGS. 1 to 6 show a detachable rubber crawler 1 of the first embodiment of a detachable crawler. FIG. 1 is a plan view showing a side opposite the tread side (inner peripheral side) of the detachable rubber crawler 1 of the first embodiment. FIG. 2 is a plan view showing the tread side (outer peripheral side) thereof, FIG. 3 is a section view taken on line X-X in FIG. 1, and FIG. 4 is a section view taken on line Y-Y in FIG. 1. FIG. 5A is a section view of a rubber pad 5 of the detachable rubber crawler 1 of the first embodiment fitted to a rubber belt part 4, and FIG. 5B is a greatly enlarged section view of an important part in FIG. 5A. FIG. 6A is a plan view showing a tread side (outside periphery side) of the rubber pad 5 of the detachable rubber crawler 1 of the first embodiment, FIG. 6B is a plan view showing a side opposite the tread side (inside periphery side) of the rubber pad 5, and FIG. 6C is a side view of the rubber pad 5.

As for the detachable rubber crawler 1, two or more steel cords 2 serving as a tensile reinforcing layer are arranged and embedded in a rubber elastic body in parallel rows in a crawler width direction, the cords extending along a crawler circumference direction. Besides, a rubber belt part 4 is so formed that core bars 3 are embedded at a fixed interval in the crawler circumference direction, and the rubber pads 5 are detachably fitted to the tread side of the rubber belt part 4 so that they can be removed and exchanged.

A rubber pad 5 is integrally formed by molding and fixing a rubber elastic body to a metal core 6. Besides, the metal core 6 is provided with protrusions 7 near right and left ends, on the inner peripheral tread side, and the protrusions 7 are provided with threaded holes 9 to threadedly receive bolts 8. Here, each of the bolts 8 serves as a fastening fixture.

On the other hand, the rubber belt part 4 is provided with concave parts 10 on the tread side of the core bars 3, the positions of the concave parts corresponding to the protrusions 7. The concave parts 10 are formed so that the protrusions 7 are interfitted therein. The concave parts 10 have through holes 11 passing from the inner peripheral tread side of the rubber belt part 4 to the tread side thereof so that the bolts 8 are fittingly inserted therein. Besides, the rubber belt part 4 is provided with interfitted holes 12 on the tread side so that the protrusions 7 are inserted therein.

The rubber pads 5 are removably fitted to the rubber belt part 4 by interfitting the protrusions 7 with the interfitted holes 12 and the concave parts 10, inserting the bolts 8 into the through holes 11, and tightening the bolts 8 in the thread holes 9.

In this case, a bolt 8 is tightened by a torque of 136 N·m (13.86 kgf·m) so that a rubber elastic body 4a, including a layer of steel cords 2 sandwiched between the metal core 6 of the rubber pad 5 and the core bar 3 of the rubber belt part 4, is pressed by a tightening force of 9.81 MPa per unit area (100 kgf/cm$^2$). In this embodiment, M14 bolts are used, and the torque coefficient is 0.02. Besides, since gross tightening area per core bar 3 (a metal core 6) is 1980 mm$^2$, the tightening area per bolt is 1980/4=495 mm$^2$.

In the drawings, 13 is a hole for discharging mud, and 14 is a tool hole in which a tool (socket wrench) for tightening a bolt is inserted.

In this embodiment, the concave parts 10 and the protrusions 7 are respectively provided on right and left sides divided by the center of the crawler width direction, and arranged around the center of each side. The layer of steel cords is divided and embedded in right and left sides from the center of the crawler width direction, and besides, still more divided and embedded in each side by the concave part 10 and the protrusion 7. Here, the rubber elastic body including the layer of steel cords is surrounded by the core bar 3 of the rubber belt part 4, the metal core 6 of the rubber pad 5, and prevention walls 6a provided on both ends of the metal core 6 in the crawler width direction. Accordingly, even if the rubber elastic body is sandwiched and pressed by the core bar 3 and the metal core 6, the rubber elastic body is prevented from escaping (being pushed out) outside in the crawler width direction, and therefore the tightening force is added positively.

Besides, the protrusion 7 is shallowly interfitted in the concave part 10. Here, the height H1 of the protrusion 7 is lower than the depth H2 from the bottom of the interfitted hole 12, including the concave part 10 on the tread side of the rubber belt part 4, and higher than the depth H3 from the top of the tread side of the concave part 10 thereto.

When the height H1 is higher than the depth H2, the protrusion 7 touches the concave part 10 before the tightening force is added to the rubber elastic body 4a including the layer of steel cords 2 sandwiched between the metal core 6 and the core bar 3. Therefore, even if the bolt is tightened firmly, the tightening force can not be added to the rubber elastic body 4a. On the other hand, when the height H1 is lower than the depth H3, the protrusion 7 is not interfitted in the concave part 10, and loading is added to the bolt 8 so as to damage it. Therefore, the depth H2 of an interfitted hole is usually made deeper by about 2 to 5 mm than the height H1 of a protrusion.

Besides, in the detachable rubber crawler 1 of this embodiment, the top of a guide protrusion of the core bar 3 forms a flat rolling contact surface 3a, and each of the ends in the crawler width direction is provided with a step part 3b serving as a rolling contact surface, on which a wheel of outside wheel type can roll. According to this, the detachable crawler can be driven on a wheel of any type, such as an inside wheel or outside wheel of exclusive type or an inside collar wheel or outside collar wheel of exchangeable type.

Figure 7:
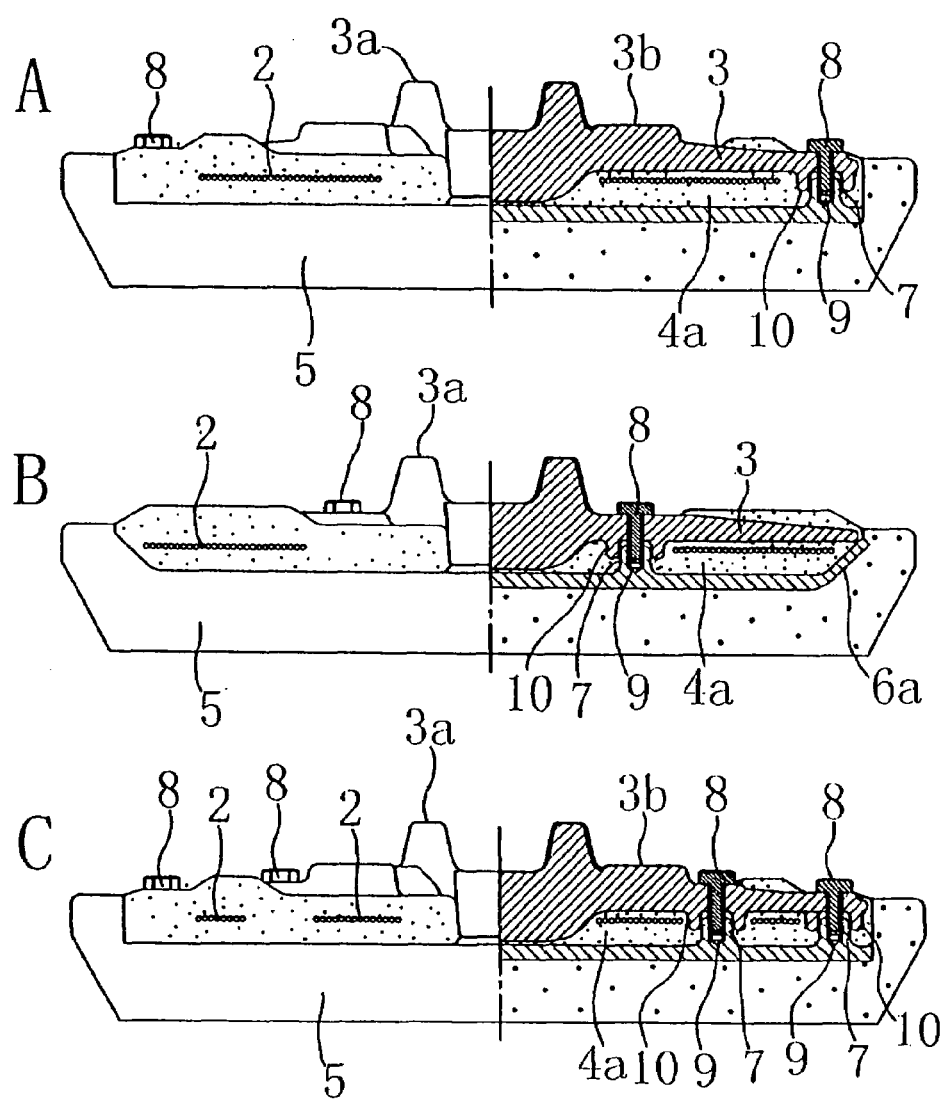
FIG. 7A is a section view showing an alternate example 1 of the first embodiment.
FIG. 7B is a section view showing an alternate example 2.
FIG. 7C is a section view showing an alternate example 3.
Figure 8:
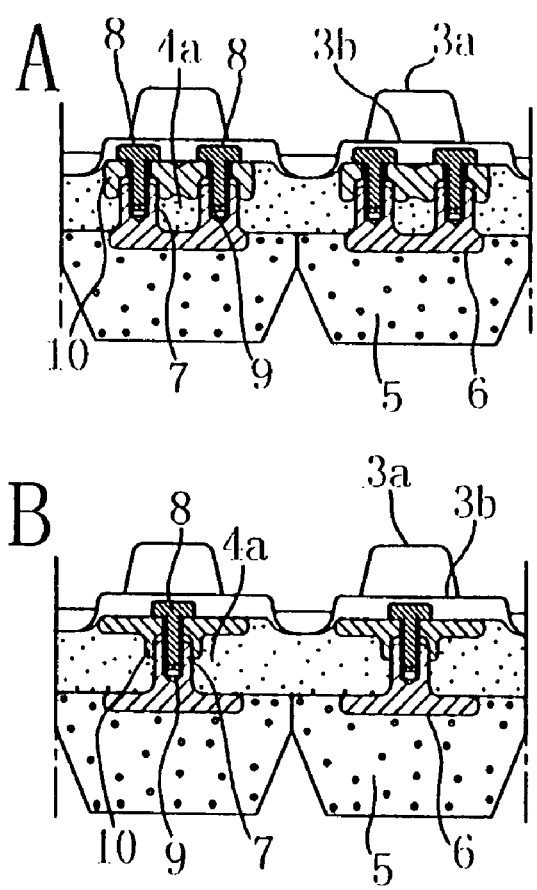
FIG. 8A is a side section view showing the first embodiment.
FIG. 8B is a side section view showing an alternate example 4 of the first embodiment.

Next, an alternate example of the concave part 10 and the protrusion 7 for fitting the rubber pad 5 to the rubber belt part 4 in the first embodiment will be explained in reference with FIGS. 7 and 8.

In FIG. 7A, the concave part 10 and the protrusion 7 for fitting the rubber pad 5 to the rubber belt part 4 are positioned at the ends in the crawler width direction.

In FIG. 7B, the concave part 10 and the protrusion 7 for fitting the rubber pad to the rubber belt part 4 are positioned at the ends of the guide protrusion in the crawler width direction. Besides, in this embodiment, the core bar 3 has no step parts 3b.

In FIG. 7C, concave parts 10 and protrusions 7 are added to the ends of the guide protrusion in the crawler width direction, and the rubber pad 5 and the rubber belt part 4 are fitted at eight positions.

In FIG. 8B, the numbers of concave parts 10 and protrusions 7 for fitting the rubber pad 5 to the rubber belt part 4 are respectively decreased in from 4 to 2. In the first embodiment shown in FIG. 8A, there are two fitting parts in the core bar 3 at the front and rear with respect to the crawler circumference direction, whereas there is one fitting part in the embodiment shown in FIG. 8B.

Though the shapes of the concave part 10 and the protrusion 7 are respectively completely round in drawings, they may be rectangular or elliptical by connecting two protrusions 7 and two concave parts 10 provided on the front and rear positions in the crawler circumferential direction, respectively. In this case, since the same effect can be gained as by the prevention wall 6a, the prevention wall 6a need not be provided.

Figure 9:
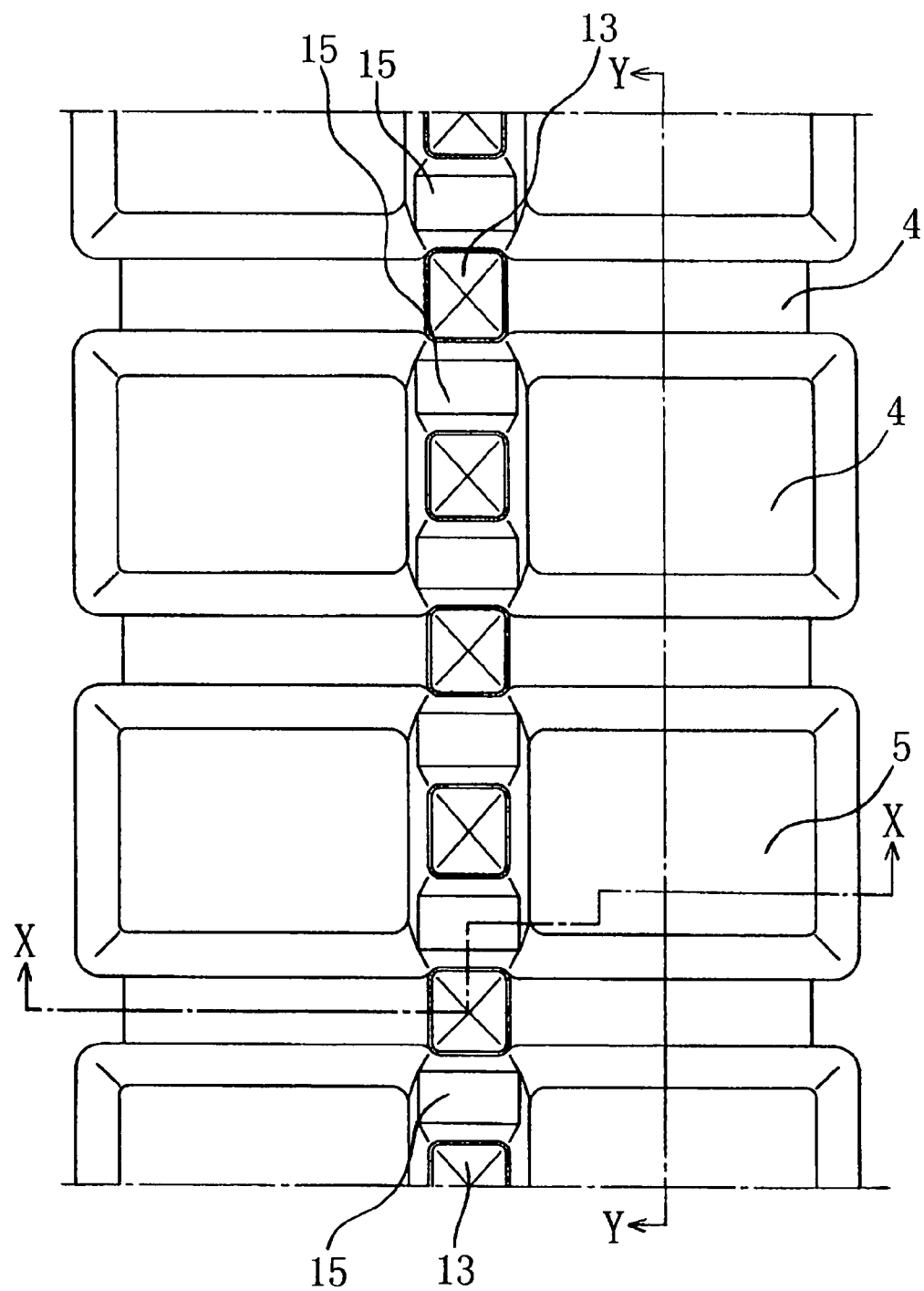
FIG. 9 is a plan view showing a tread side of a detachable rubber crawler of the second embodiment.
Figure 10:
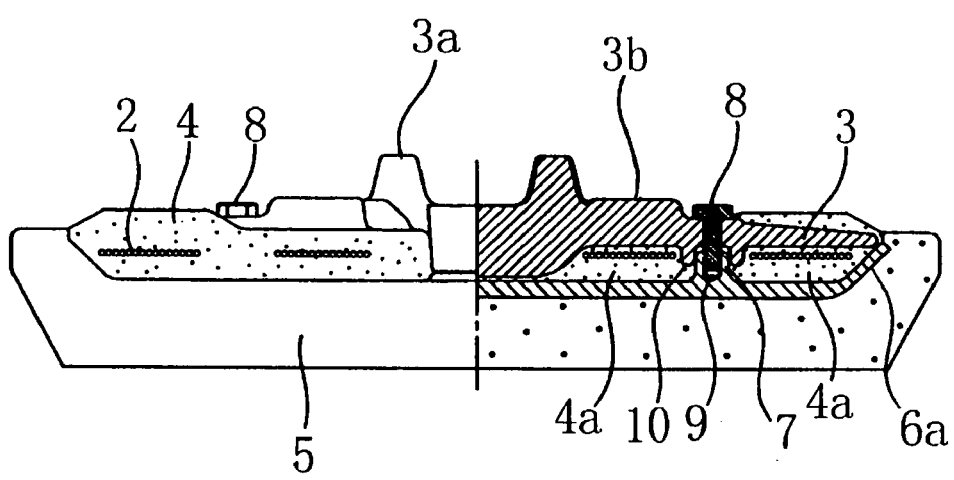
FIG. 10 is a section view taken on line X-X in FIG. 9.
Figure 11:
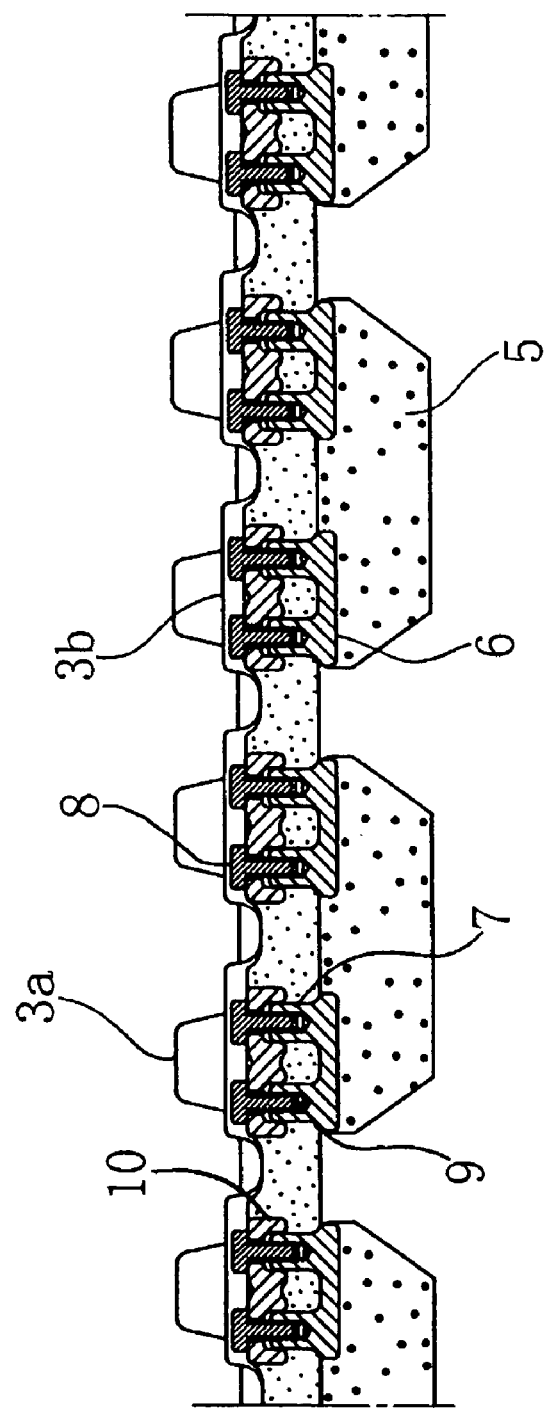
FIG. 11 is a section view taken on line Y-Y in FIG. 9.

FIGS. 9 to 11 show a detachable rubber crawler 1 of the second embodiment of the invention. FIG. 9 is a plan view showing the tread side (outer peripheral side) of the detachable rubber crawler 1, FIG. 10 is a section view taken on line X-X, and FIG. 11 is a section view taken on line Y-Y.

As for the detachable rubber crawler 1 of the second embodiment, a rubber pad 5 is the same size as a lug rubber part crossing two adjacent core bars 3 in the rubber belt 4. According to this, the lug rubber part of the rubber pad 5 can be enlarged, thereby improving durability.

Besides, the rubber pad 5 has a hole 13 for discharging mud at the center of the crawler width direction, and the portion sandwiched between the engaging holes serves as an inside lug 15 with low one step height.

Figure 12:
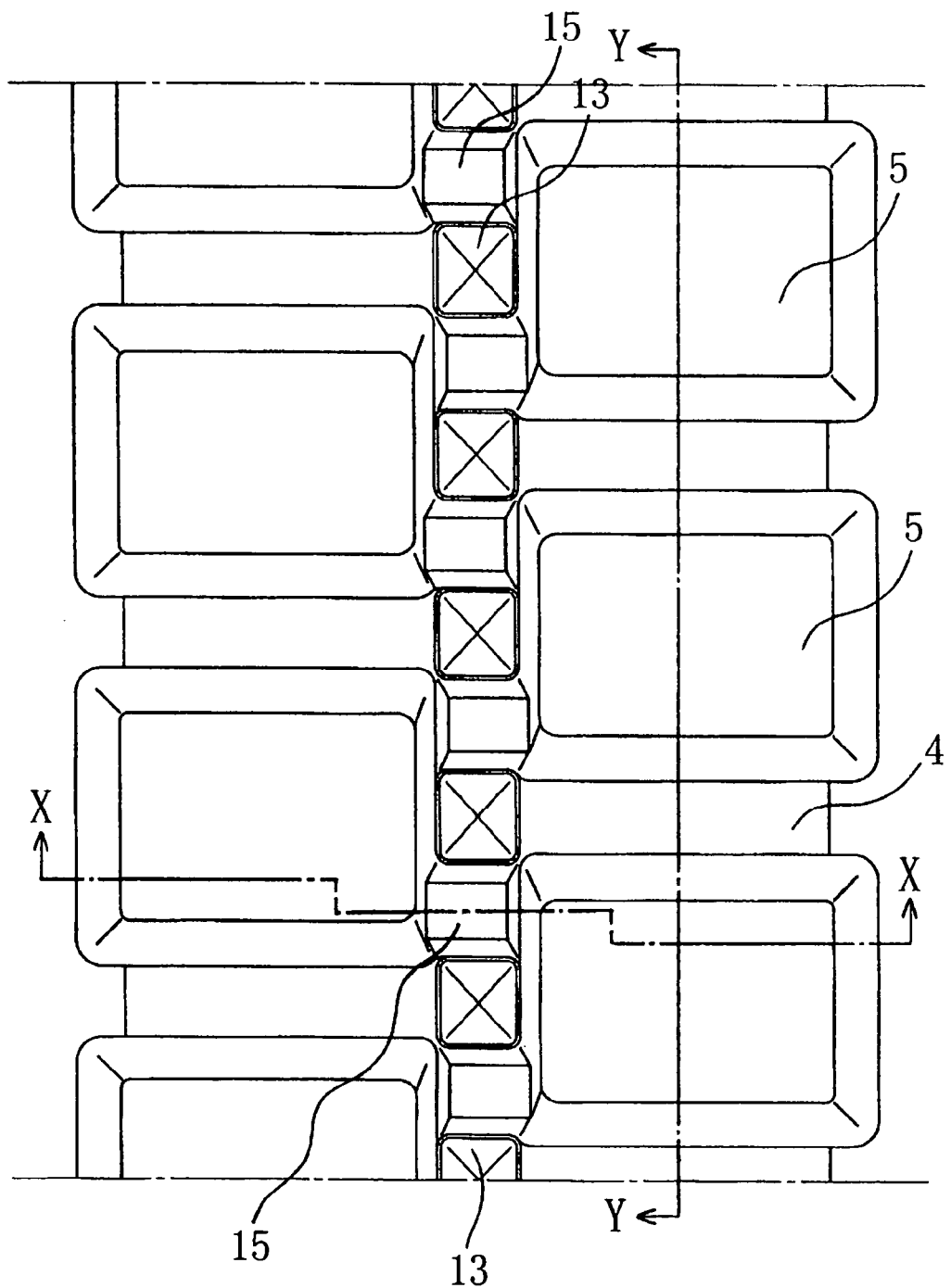
FIG. 12 is a plan view showing a tread side of a detachable rubber crawler of the third embodiment.
Figure 13:
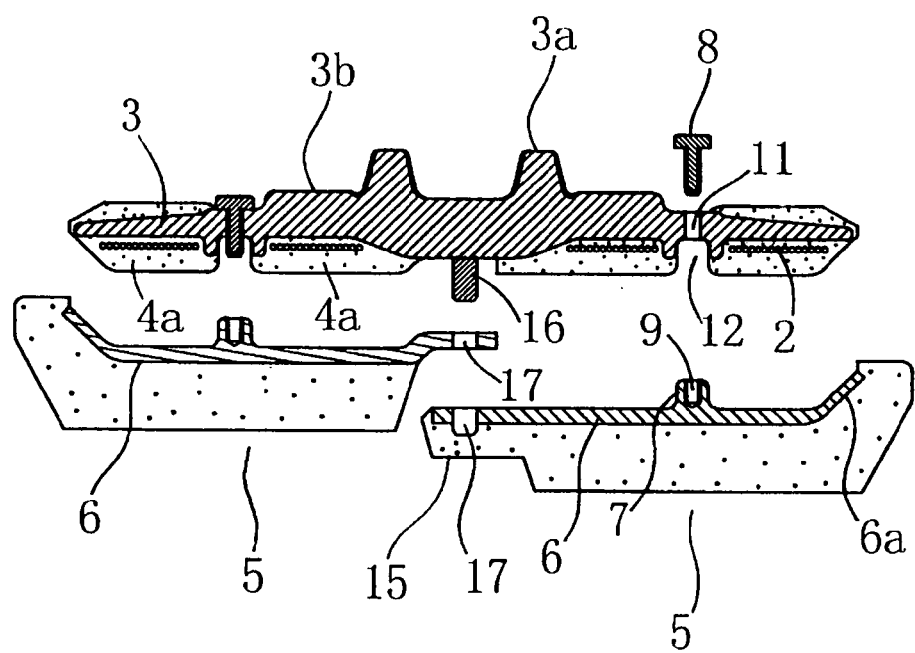
FIG. 13 is a section view taken on line X-X in FIG. 12.
Figure 14:
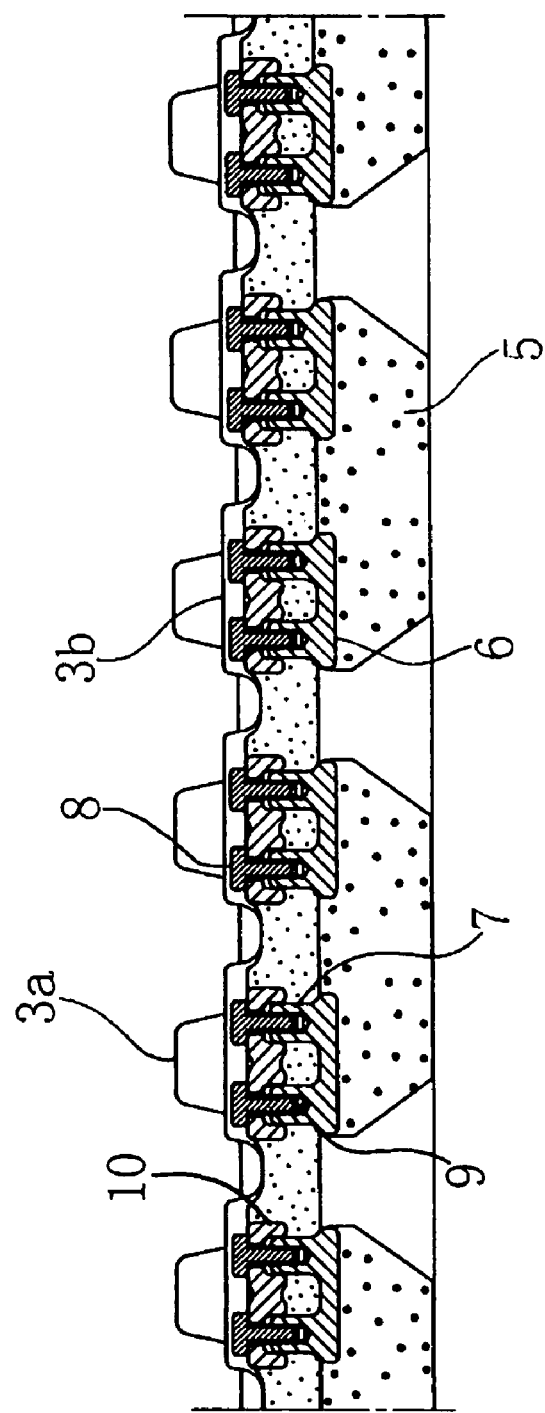
FIG. 14 is a section view taken on line Y-Y in FIG. 12.

Next, a detachable rubber crawler 1 of the third embodiment in the invention will be explained in reference with FIGS. 12 to 14.

As for the detachable rubber crawler 1 of the third embodiment, the rubber pad 5 in the second embodiment is divided into right and left portions from the center of the crawler width direction, and the divided right and left rubber pads 5 are shifted with respect to one another forward and rearward in the circumferential direction of the crawler in a staggered arrangement.

According to this, the rubber lug parts are arranged entirely in front and in rear in the crawler circumference direction. That is, the lug rubber part of the rubber pad 5 is at either the right or left side in the crawler width direction at the portion with low rigidity between the adjacent core bars 3 embedded in the rubber belt part 4. According to this, the rigidity of the crawler is uniform, thereby preventing the crawler from coming off of the travel device, and the stress from concentrating to the rubber belt part 4 with the core bar 3 not embedded. Accordingly, the detachable rubber crawler 1 can have good elasticity.

Besides, an inside lug 15 is integrally molded at one place to the rubber pads 5 arranged on both sides in the crawler width direction, and besides, is arranged in front of and behind the hole 13 in the crawler circumferential direction.

A pin 16 is protrusively provided on the center of the core bar 3 embedded in the rubber belt part 4 on the tread side. The pin 16 is interfitted with a pin hole 17 provided on the metal core 6 of the rubber pad 5, thereby preventing the rubber pad 5 from shifting longitudinally or laterally.

In the second and the third embodiments, though the rubber pads 5 are the size of lug rubber parts crossing the two adjacent core bars 3 in the rubber belt 4, they may be the same size as one crossing three core bars 3 or more.

Figure 15:
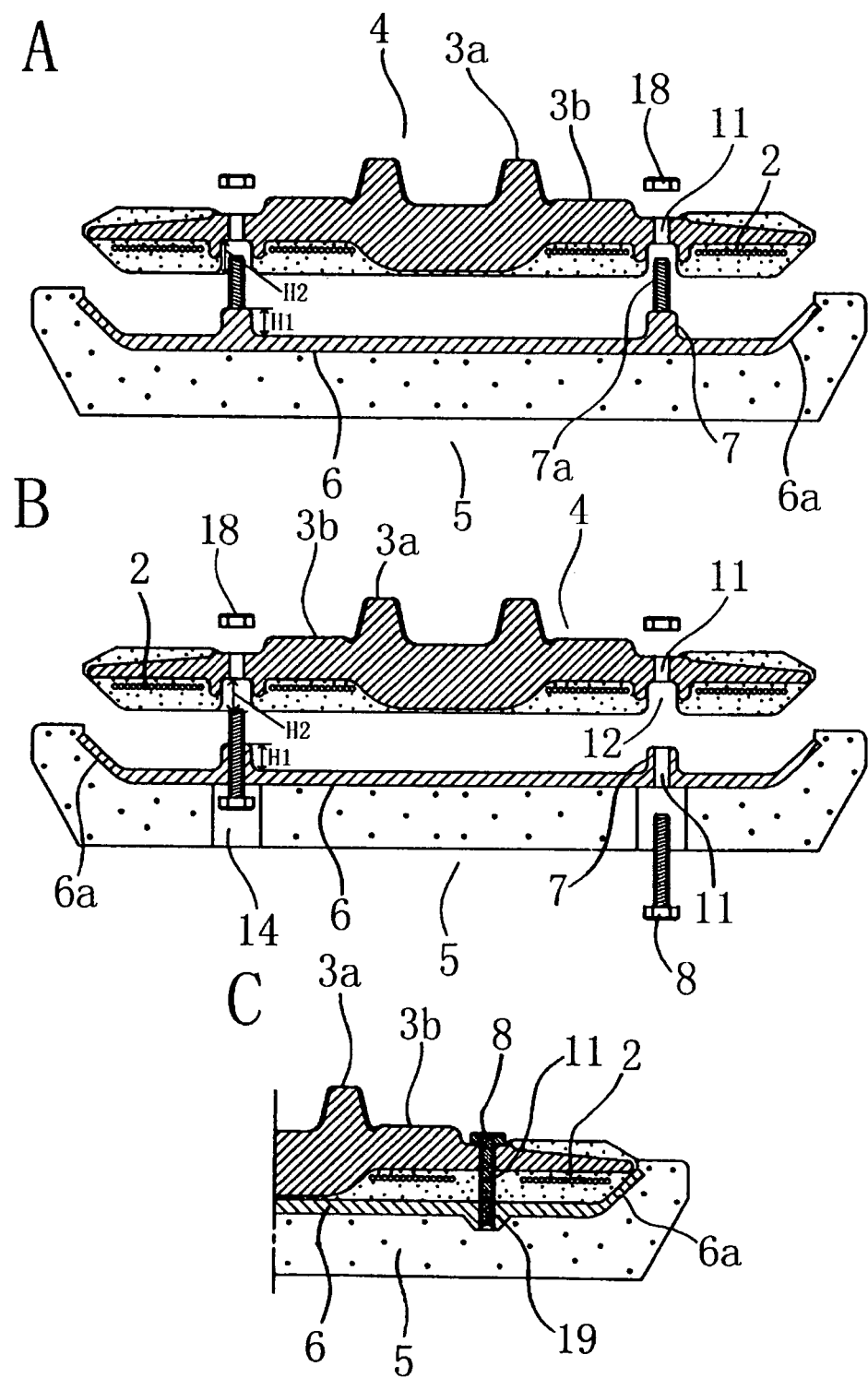
FIG. 15A is a section view showing an alternate example 1 of a fastening fixture of a fitting member.
FIG. 15B is a section view showing an alternate example 2 thereof.
FIG. 15C is a partial section view showing an alternate example 3 thereof.

Next, an alternate example about a fastening fixture of a fitting member in the above-mentioned embodiments will be explained in reference with FIG. 15.

In the embodiment shown in FIG. 15A, a thread part of a bolt is integrally molded on the protrusion 7 of the rubber pad 5, and, a male thread part 7a is provided on the protrusion 7. The male thread part 7a and the protrusion 7 are interfitted into the rubber belt part 4, and a nut 18 is tightened on the male thread part 7a protrudingly passing therethrough. Thus, the rubber pad 5 is fitted on the rubber belt part 4, and the rubber elastic body including the layer of steel cords 2 sandwiched between the metal core 6 in the rubber pad 5 and the core bar 3 in the rubber belt part 4 is pressed.

In the embodiment shown in FIG. 15B, a tool hole 14 is provided on the rubber elastic body of the rubber pad 5. A bolt 8 is interfitted therein from the tread side of the rubber pad 5 toward the metal core 6 of the inner peripheral side, or a tool for fastening bolts (a socket wrench etc.) is interfitted therein. Besides, a through hole 11 is provided in the protrusion 7 of the metal core 6, the bolt 8 is inserted therein from the tread side of the rubber pad 5, and a nut 18 is tightened on the male thread of the bolt 8 protruding from the opposite rubber belt part 4. Thus, the rubber pad 5 is fitted to the rubber belt part 4, and the rubber elastic body including the layer of steel cords 2 sandwiched between the metal core 6 and the core bar 3 is pressed. Besides, in this case, the bolt 8 may be inserted from the inner peripheral side of the rubber belt part 4, and the nut 18 may be tightened from the tread side of the rubber pad 5.

In the embodiment shown in FIG. 15C, there is no protrusion on the metal core 6, which is different from the above-mentioned embodiment. That is, in this embodiment, a female thread 19 is provided on the metal core 6 in the rubber pad 5, and screwed to the bolt 8 inserted from the inner peripheral side of the core bar 3. Then, the rubber elastic body including the layer of steel cords 2 sandwiched between the core bar 3 and the metal core 6 is pressed by the screwing motion.

Figure 16:
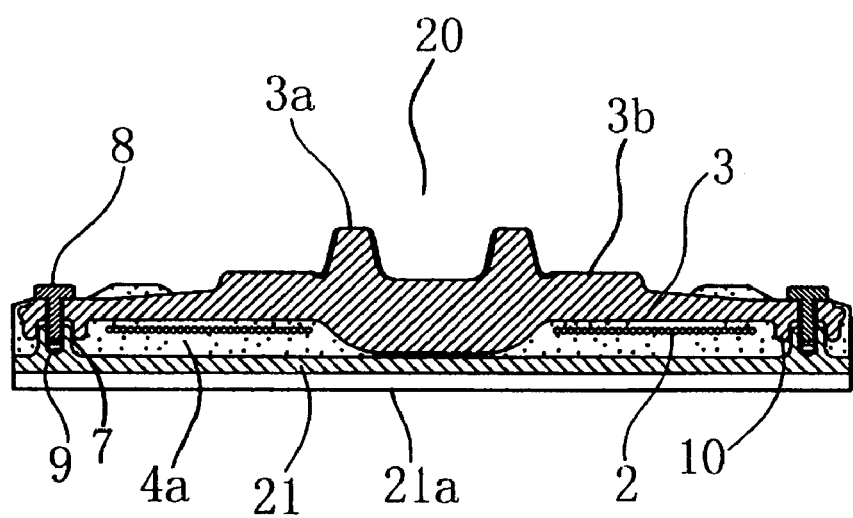
FIG. 16 is a section view in a crawler width direction showing a detachable iron crawler of the fourth embodiment.

FIG. 16 is a section view in the crawler width direction, which shows a detachable iron crawler 20 of the fourth embodiment of the invention.

In the detachable iron crawler 20 of the fourth embodiment, a steel track shoe 21, instead of a rubber pad 5, is fitted to the rubber belt part 4. The detachable iron crawler 20 is composed like the above-mentioned embodiments, and so formed that the steel track shoe 21 is pressed to the rubber elastic body including the layer of steel cords 2 sandwiched with the core bar 3 in the rubber belt 4 at a fixed force by tightening the bolt 8.

Figure 17:
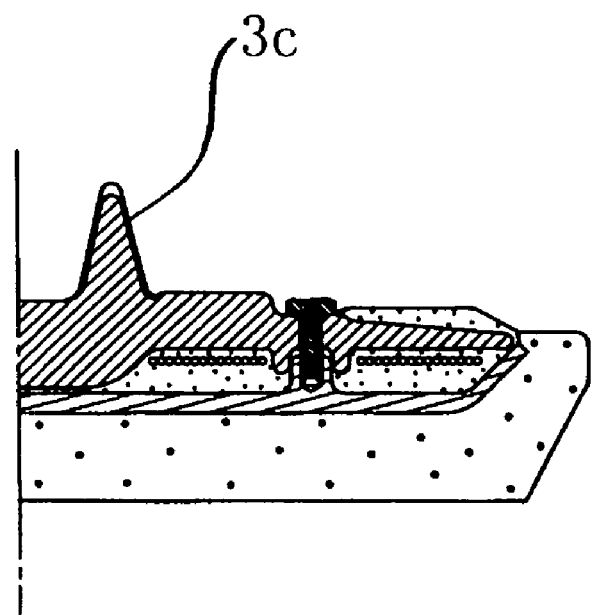
FIG. 17 is a section view of showing an important part of an alternate example thereof.
Figure 18:
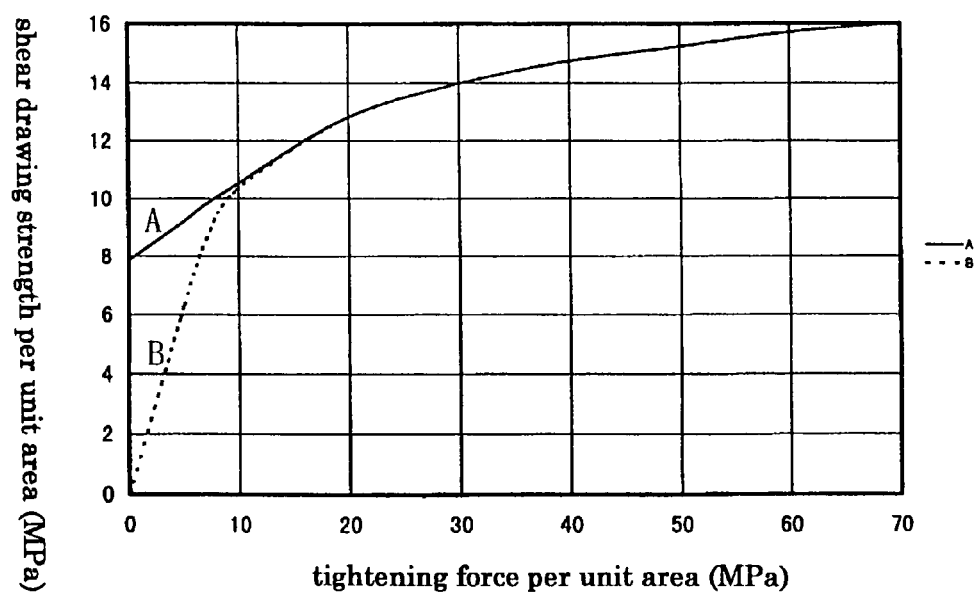
FIG. 18 is a graph showing the relation of tightening force per unit area (MPa) for pressing steel cords and a rubber elastic body, and the shear drawing strength per unit area (MPa) therebetween.
Figure 19:
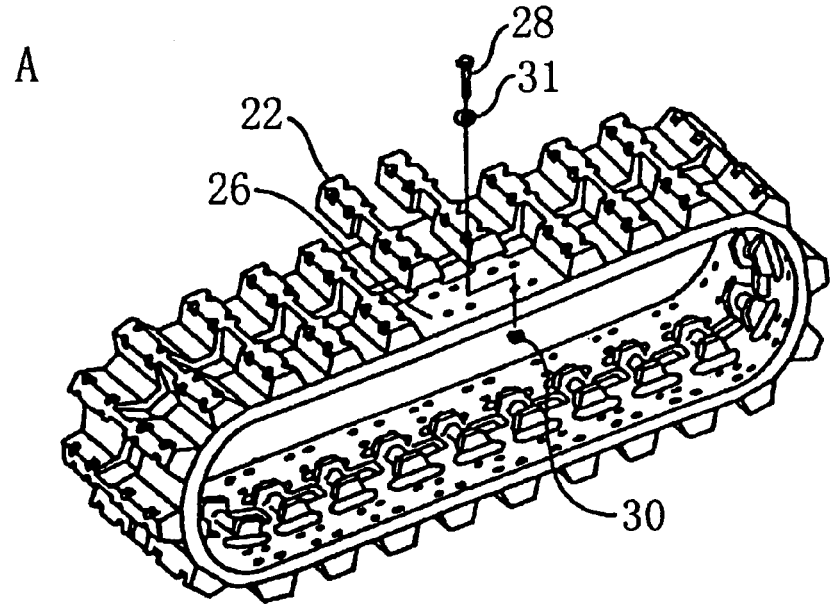
FIG. 19A is a perspective view of a conventional detachable rubber crawler.
FIG. 19B is a plan view of the side opposite the tread side thereof.
Figure 19:
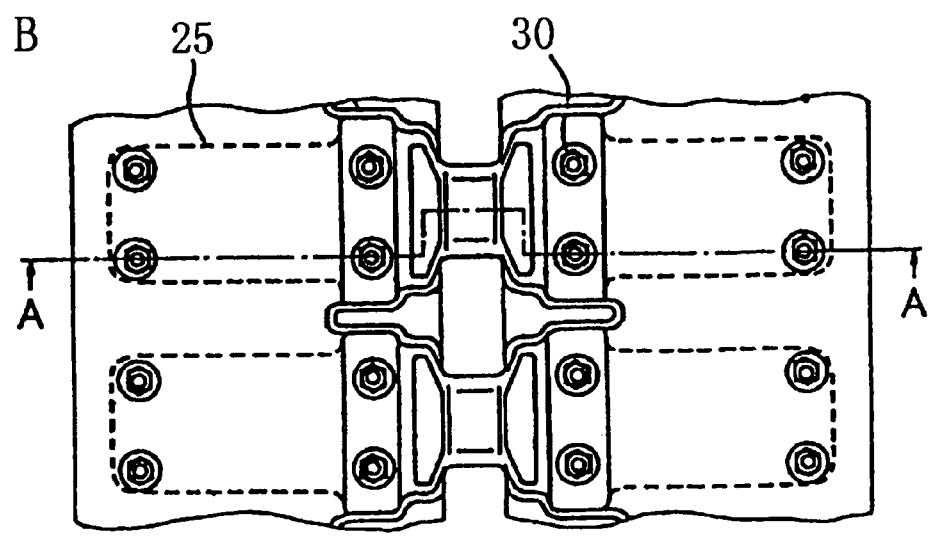
Figure 20:
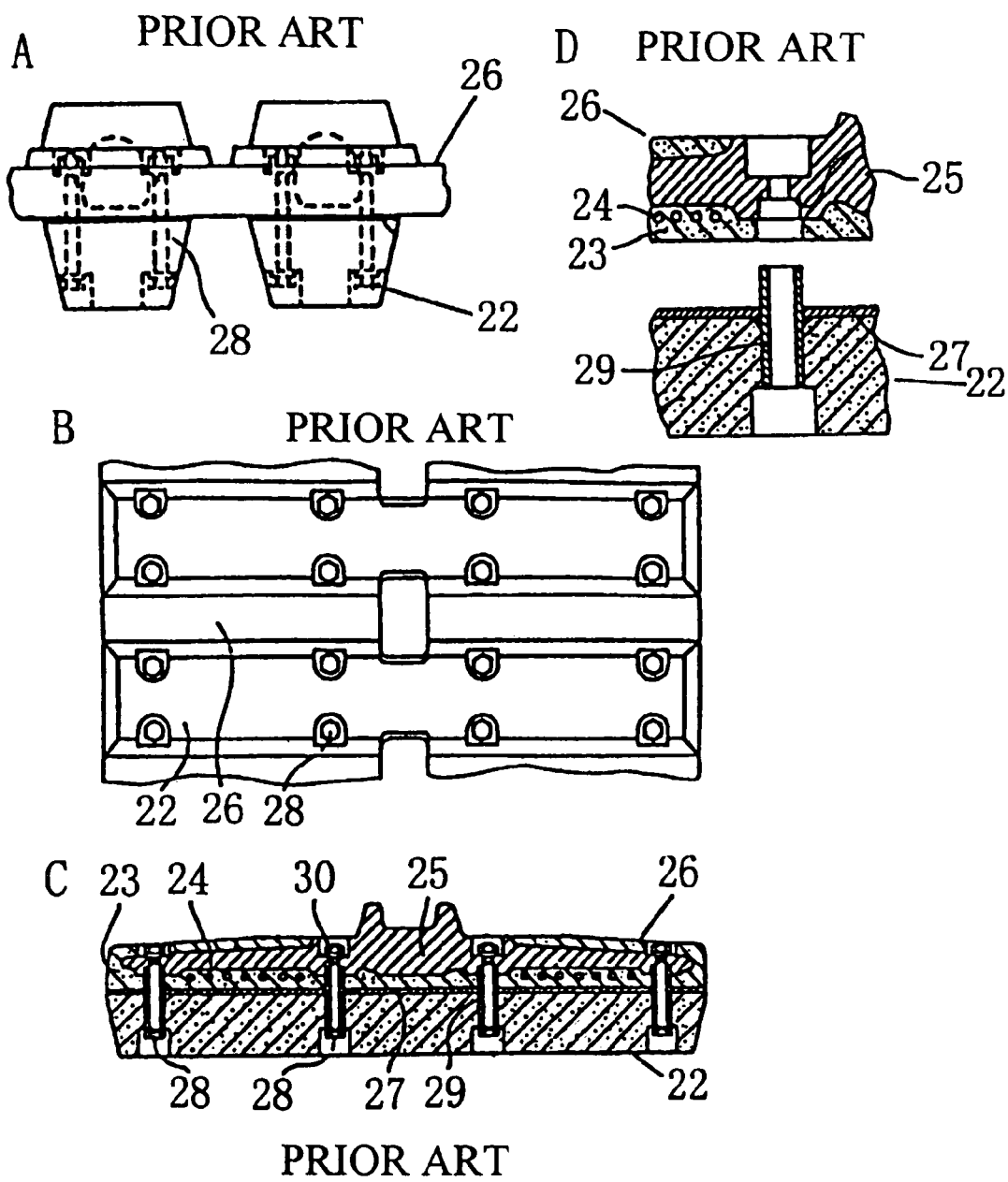
FIG. 20A is a side view of the conventional detachable rubber crawler and FIG. 20B is a plan view of the tread side thereof.
FIG. 20C is a section view taken on line A-A in FIG. 19B.
FIG. 20D is a detailed section view of a fitting part of a rubber belt part and a detachable rubber pad.

FIG. 17 is a section view of an important part showing an alternate example of the above-mentioned embodiment, and therein, the top of a guide protrusion of a core bar 3 is not a flat rolling contact surface 3a but a pointed protrusion 3c.

The invention is not restricted to the above-mentioned embodiments, and it is possible to combine these embodiments suitably.

In the invention, a crawler comprises detachable pads composed of one article or two or more independent joint articles and a rubber belt part arranged on a crawler driving wheel side into which a tensile reinforcing layer and core bars are embedded. And therein, the detachable pads are removably fitted to the rubber belt part, and can be exchanged. In this case, the detachable pads are fitted to the rubber belt part so that a metal core or a track shoe in a detachable pad and a core bar in the rubber belt part are connected by tightening fastening fixtures. And tightening force certainly acts on the rubber elastic body and the tensile reinforcing layer sandwiched between the metal core or the track shoe in the detachable pad and the core bar in the rubber crawler in a specific range. Therefore, the unit-area drawing shear stress of the detachable crawler between the rubber elastic body and the tensile reinforcing layer of the rubber belt part increases. Besides, since the rubber belt part increases in durability, the detachable crawler can prevent noise and improve in durability and convenience.

The invention claimed is:

1. A detachable crawler comprising:
    a rubber belt part (4), said rubber belt part comprising a rubber elastic body (4a), a tensile reinforcing layer (2) and core bars (3),
    said tensile reinforcing layer (2) comprising a plurality of tensile reinforcing members arranged and embedded in the rubber elastic body (4a) in parallel rows, the rows extending in a crawler width direction, and the tensile reinforcing members extending in a crawler circumferential direction, and said core bars being embedded in the rubber elastic body at fixed intervals in the crawler circumference direction; and
    detachable pads, each of said detachable pads being one of a) a rubber pad (5) comprising a rubber elastic body and a metal core (6) having protrusions (7) having a height (H1) on an inner peripheral side thereof and (b) a metal pad comprising a steel track shoe (21) having protrusions (7) having a height (H1) on an inner peripheral side thereof, each of said detachable pads being mountable to and dismountable from a tread side of the rubber belt part (4) by fastening fixtures;
    wherein the rubber belt part (4) is provided with interfitted holes (12) having a height (H2) on portions corresponding to the protrusions (7), the height (H1) of each of the protrusions (7) is less than the depth (H2) of each of the interfitted holes (12), the rubber elastic body (4a) is pressed by tightening fastening fixtures (8, 18), and a tightening force of 4.90 to 78.5 MPa per unit area is applied to the rubber elastic body (4a) including the tensile reinforcing layer sandwiched between the core bars (3) and the detachable pads.

2. A detachable crawler comprising:

a rubber belt part (4), said rubber belt part comprising a rubber elastic body (4a), a tensile reinforcing layer (2) and core bars (3), said tensile reinforcing layer (2) comprising a plurality of tensile reinforcing members arranged and embedded in the rubber elastic body (4a) in parallel rows, the rows extending in a crawler width direction, and the tensile reinforcing members extending in a crawler circumferential direction, and said core bars being embedded in the rubber elastic body at fixed intervals in the crawler circumference direction; and detachable pads, each of said detachable pads being a rubber pad (5) comprising a rubber elastic body and a metal core (6) having protrusions (7) having a height (H1) on an inner peripheral side thereof, each of said detachable pads being mountable to and dismountable from a tread side of the rubber belt part (4) by fastening fixtures;

wherein the rubber belt part (4) is provided with interfitted holes (12) having a height (H2) on portions corresponding to the protrusions (7), the height (H1) of each of the protrusions (7) is less than the depth (H2) of each of the interfitted holes (12), and the rubber elastic body (4a) is pressed by tightening fastening fixtures (8, 18), and wherein the metal core has opposite ends in the crawler width direction and prevention walls (6a) at said ends to prevent the rubber elastic body (4a) from escaping when fastening fixtures (8, 18) are tightened.

3. A detachable crawler comprising:

a rubber belt part (4), said rubber belt part comprising a rubber elastic body (4a), a tensile reinforcing layer (2) and core bars (3), said tensile reinforcing layer (2) comprising a plurality of tensile reinforcing members arranged and embedded in the rubber elastic body (4a) in parallel rows, the rows extending in a crawler width direction, and the tensile reinforcing members extending in a crawler circumferential direction, and said core bars being embedded in the rubber elastic body at fixed intervals in the crawler circumference direction; and detachable pads, each of said detachable pads being a rubber pad (5) comprising a rubber elastic body and a metal core (6) having protrusions (7) having a height (H1) on an inner peripheral side thereof, each of said detachable pads being mountable to and dismountable from a tread side of the rubber belt part (4) by fastening fixtures;

wherein the rubber belt part (4) is provided with interfitted holes (12) having a height (H2) on portions corresponding to the protrusions (7), the height (H1) of each of the protrusions (7) is less than the depth H2 of each of the interfitted holes (12), and the rubber elastic body (4a) is pressed by tightening fastening fixtures (8, 18), and wherein the metal core has opposite ends in the crawler width direction, wherein the protrusions (7) are located near said ends, and the rubber belt part (4) has concave parts (10) for providing access to portions of the core bars (3) that interfit with the protrusions (7).

4. A detachable crawler as claimed in claim 1, wherein each detachable pad is a metal pad, the steel track shoe having opposite ends in the crawler width direction and prevention walls at said ends to prevent the rubber elastic body (4a) from escaping when fastening fixtures (3, 18) are tightened.

5. A detachable crawler as claimed in claim 1, wherein each detachable pad is a metal pad, the steel track shoe having opposite ends in the crawler width direction, the protrusions (7) are near said ends, and the rubber belt part (4) has concave parts (10) for providing access to portions of the core bars (3) that interfit with the protrusions (7).

* * * * *